United States Patent [19]

Muramatsu et al.

[11] Patent Number: 5,628,039
[45] Date of Patent: May 6, 1997

[54] LENS-FITTED PHOTOGRAPHIC FILM UNIT

[75] Inventors: Katsuji Muramatsu; Fuminori Kawamura; Hirofumi Katsura, all of Kanagawa; Hideo Sasajima, Ibaragi, all of Japan

[73] Assignee: Fuji Photo Film Co., Ltd., Kanagawa, Japan

[21] Appl. No.: 251,426

[22] Filed: May 31, 1994

[30] Foreign Application Priority Data

| May 28, 1993 | [JP] | Japan | 5-127021 |
| May 28, 1993 | [JP] | Japan | 5-127022 |
| Apr. 15, 1994 | [JP] | Japan | 6-077571 |

[51] Int. Cl.⁶ .......................... G03B 17/17; G03B 17/20
[52] U.S. Cl. .......................... 396/296; 396/351; 396/505; 396/535
[58] Field of Search .................. 354/288, 195.1, 354/219, 273, 270, 150, 289.1, 229, 465

[56] References Cited

U.S. PATENT DOCUMENTS

| 2,378,406 | 10/1945 | Harris . | |
| 4,195,926 | 4/1980 | Katayama | 354/273 |
| 4,213,686 | 7/1980 | Kellner | 354/195 |
| 4,307,951 | 12/1981 | Saito | 354/195 |
| 4,344,685 | 8/1982 | Milatz | 354/173 |
| 4,544,252 | 10/1985 | Tsukamoto | 354/289.1 |
| 4,910,545 | 3/1990 | Fujibayashi et al. | 354/225 |
| 5,001,502 | 3/1991 | Douglas | 354/86 |
| 5,084,719 | 1/1992 | Hara et al. . | |
| 5,140,354 | 8/1992 | Burnham | 354/203 |
| 5,235,367 | 8/1993 | Boyd et al. . | |
| 5,381,200 | 1/1995 | Takayai | 354/250 |

FOREIGN PATENT DOCUMENTS 33-1276  2/1958  Japan .

*Primary Examiner*—W. B. Perkey
*Attorney, Agent, or Firm*—Young & Thompson

[57] ABSTRACT

A telephotographic optical system is incorporated into a mechanism unit with an exposure mechanism, and the mechanism unit is removably attached to a main body having a cassette chamber and a film roll chamber as an integral body. The telephotographic optical system is constituted by a telephotographic taking lens, and a pair of mirrors attached to an exposure chamber so as to conduct light entering through the taking lens along a Z-shaped light path toward an exposure aperture. A lens aperture changing mechanism is also incorporated in the mechanism unit. A switching member of the lens aperture changing mechanism is disposed on an upper wall portion of the film unit. An aperture-stop member having at least a lens aperture is moved by the switching member so as to place the lens aperture in the exposure light path. A color filter or an ND filter is inserted in the field of view of the viewfinder to indicate that the lens aperture is placed in the exposure light path, in cooperation with the aperture-stop member.

23 Claims, 13 Drawing Sheets

LENS-FITTED PHOTOGRAPHIC FILM UNIT

BACKGROUND OF THE INVENTION

1. Field of the Invention

The present invention relates to a lens-fitted photographic film unit, and more particularly to a telephoto-type lens-fitted photographic film unit having a Z-shaped and elongated optical path and a lens aperture changing mechanism.

2. Related Art

Various types of lens-fitted photographic film units, hereinafter referred to as film units, have been widely known, each of which is pre-loaded with film and has a simple picture-taking mechanism so that anyone can easily enjoy photography.

U.S. Pat. No. 5,084,719 discloses a telephoto-type film unit whose taking lens has a focal length of about 70 to 80 mm and an f-number of f/12 to 14. The lens is disposed in substantially the same plane as the front wall of the unit housing. A pair of mirrors are arranged to define a Z-shaped light path inside the unit housing, so that the light path may be long enough for telephotography, without the need for increasing the thickness of the housing.

The unit housing of the known telephoto-type film unit is basically constituted of a main body and front and rear covers removably attached to the main body. The main body is formed from a synthetic resin as an integral body having a cassette chamber or film take-up chamber, a film roll chamber or film supply chamber, an exposure frame formed between these chambers and an exposure chamber disposed in front of the exposure frame to permit light from the taking lens to fall on the photographic film.

In the main body, a shutter base plate is attached to an upper front portion of the exposure chamber, and a barrel having a stray light shielding plate is inserted from above, behind the shutter base plate. The first mirror is attached to an upper oblique opening in the exposure chamber formed behind the barrel. A cover member having a mirror hold down portion is mounted to close the top opening of the exposure chamber and the first mirror. A shutter cocking mechanism and a film advancing mechanism are mounted to one side of the exposure chamber. A shutter blade is attached to the shutter base plate, and the second mirror is attached to a lower oblique opening formed in a lower front portion of the exposure chamber. A shutter cover having a mirror holding portion covers the front of the shutter blade and the second mirror. The shutter cover is secured to the exposure chamber through snap-in engagement without using screws or adhesives. Thereafter, the taking lens is assembled in a lens holder which is integrally formed with the shutter cover. After the front cover is attached to the main body, a film cassette and a roll of photographic film pulled out from the film cassette and wound in the roll are positioned in the cassette chamber and the film roll chamber, respectively, in a dark room, and the rear cover is attached to the rear of the main body.

Recently, in the interest of environmental protection or reduction of industrial waste, the unit housing of the used film unit is reused or recycled. The front and rear covers are melted to be recycled as a plastic material, because they are often damaged during the use or the disassembly of the film unit. The main body is also recycled as scrap plastic material, because the film roll chamber and the exposure frame directly contact the photographic film, and thus might damage the photographic film if any dust or particles are on these portions.

However, as the mirrors mounted on the main body are made from different materials, such as glass, than that of the main body, it is necessary for recycling the main body to remove the mirrors therefrom. Besides, the mirrors themselves can be reusable since they are protected from the ambient. Also the picture-taking mechanisms are reusable in most cases. Therefore, it is desirable to remove these reusable parts from the main body, so as to reuse them. It is known in the art of these film units to assemble the picture-taking mechanisms into a unit and removably attach this unit to the main body. But the mirrors can be easy to break and difficult to remove from the main body reliably. Therefore, the cost of recycling components of the telephoto-type film units has been great.

On the other hand, a telephoto-type single-use camera "KODAK FUN SAVER TELEPHOTO 35" (trademark) has been marketed by Eastman Kodak Company. This camera is loaded with a film of film speed of ISO 1600, and has a lens aperture changing mechanism for switching the lens aperture between a daylight photography mode, that is a mode suitable for picture-taking in sunny daylight, and a night game photography mode, that is a mode suitable for picture-taking of sporting events played at night under brightly flood-lit conditions. But the night game photography mode is suitable for picture-taking in cloudy daylight as well. To set the night game photography mode, a switching lever disposed on one side of the taking lens is operated to change the size of the lens aperture from f/11 to f/22. At the same time, a warning flag formed on the tip of the switching lever is placed in front of the viewfinder to indicate that the lens aperture size has been changed to the night game photography mode.

However, because the viewfinder of the Kodak camera is of the see-through type and has a filter with a high neutral density of about 1.8 log attached thereto, the warning flag is so inconspicuous that the photographer can overlook it and take a picture with an improper lens aperture size. Moreover, because a knob for operating the switching lever is disposed in the front of the camera housing, it is necessary to turn the camera toward the photographer every time mode switching or lens aperture changing is required.

OBJECTS OF THE INVENTION

In view of the foregoing, an object of the present invention is to provide a telephoto-type film unit which is easy to assemble and disassemble and whose parts are efficiently reusable.

Another object of the present invention is to provide a film unit having a lens aperture changing mechanism which is easy to operate without the need for changing the posture of the film unit, and which makes it easy to recognize the lens aperture condition.

SUMMARY OF THE INVENTION

To achieve the above and other objects, the present invention incorporates a telephotographic optical system into a mechanism unit with exposure mechanisms, and removably attaches the mechanism unit to a main body having a cassette chamber and a film roll chamber as an integral body.

Thereby, the telephotographic optical system is easily mounted on, and is easily and safely detached from, the main body.

The lens aperture changing mechanism of the present invention provides a switching member disposed on a top wall portion of the film unit to move a lens aperture into or out of the light path. The lens aperture is formed through an aperture-stop member which is moved by the switching member. An indication member such as a color filter or an ND filter is inserted in the field of view of the viewfinder when the lens aperture is inserted in the light path.

Because the switching member is disposed on the top wall portion of the film unit, it is unnecessary, for operating the switching member, to change the posture of the film unit.

BRIEF DESCRIPTION OF THE DRAWINGS

Other objects and advantages of the present invention will become apparent from the following detailed description of the preferred embodiments when read in connection with the accompanying drawings, wherein like reference numerals designate like or corresponding parts throughout the several views, and wherein.

DETAILED DESCRIPTION OF THE PREFERRED EMBODIMENTS

Figure 1:
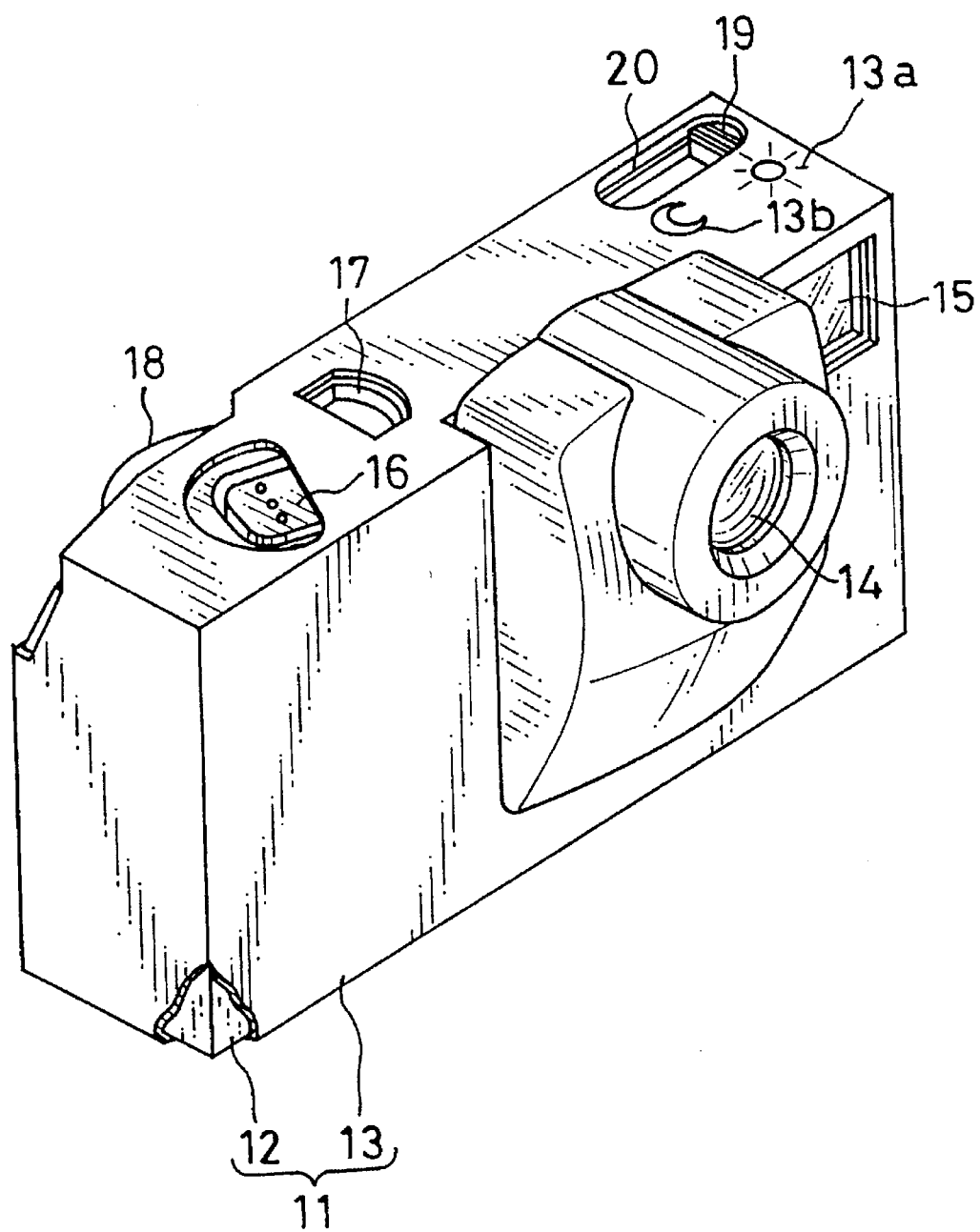
FIG. 1 is a perspective view of a telephoto-type film unit according to a preferred embodiment of the invention.

Referring to FIG. 1, a film unit 11 is constituted of a unit body 12 and an outer casing 13 encasing the unit body 12. The outer casing 13 has ornamentation and information printed thereon. The unit body 12 is provided with a taking lens 14, a viewfinder 15, a shutter release button 16, an available frame number display window 17, a film advancing wheel 18 and a mode switching knob 19, which are exposed to the outside through openings in the outer casing 13. The taking lens 14 is disposed in an upper front portion of the unit body 12, and protrudes forward from the rest of the film unit 11. The taking lens 14 is a telephotographic lens having a focal length of 100 mm. The viewfinder 15 has an optical system and a neutral density (ND) filter or a color filter which may be removably inserted in the viewfinder optical system, as will be described below.

The mode switching knob 19 is operated to select either daylight photography mode or night photography mode. The daylight photography mode is selected when the knob 19 is moved in one end of a slot 20 which is indicated by a symbol 13a of the sun as shown in FIG. 1. When the knob 19 is slid to the other end of the slot 20 which is indicated by a symbol 13b of the moon, the night photography mode is selected. These symbols 13a and 13b are printed on the outer casing 13. In the daylight photography mode, the filter is inserted in the viewfinder 15, and a small lens aperture is placed in the optical path of the taking lens 14. In the night photography mode, the filter is retracted from the viewfinder 15, and a large lens aperture is placed in the optical path. The night photography mode is suitable for picture-taking at night, such as photographing a night view or a nighttime sporting event played under bright night lights.

Figure 2:
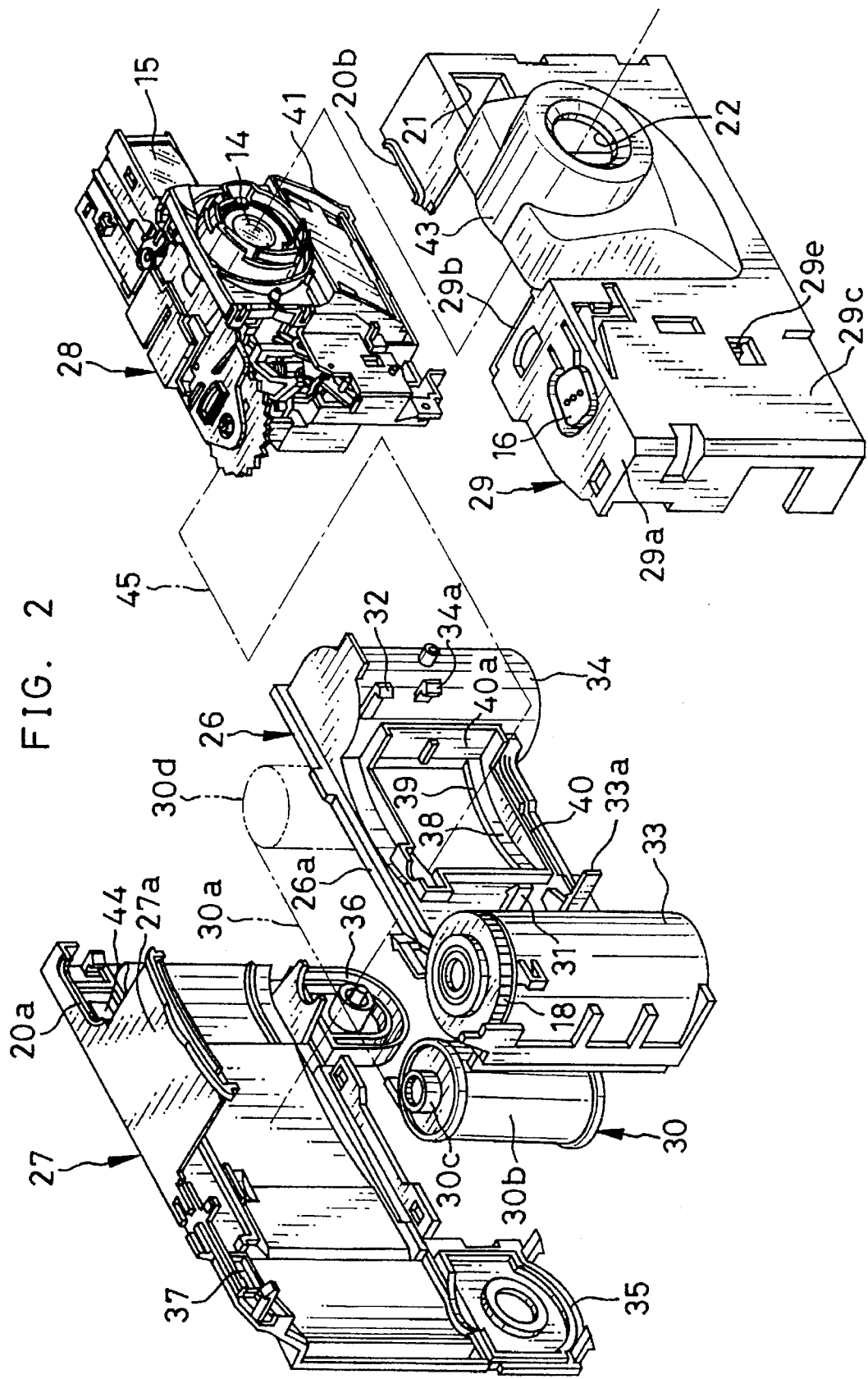
FIG. 2 is an exploded perspective view of the unit body of the film unit shown in FIG. 1, removed from the outer casing of the film unit.

As shown in FIG. 2, the unit body 12 is constituted of a main body 26, a rear cover 27, a mechanism unit 28 and a front cover 29. The main body 26 holds a photographic film cassette 30 of ISO 135 type (ISO: 1007–1979) containing high speed photographic film 30a of, for example, ISO 800.

The mechanism unit 28 is removably attached to the front of the main body 26 through engagement with hooks 31 and 32 of the main body 26. As will be described in detail below a photography mode switching mechanism is also incorporated in the mechanism unit 28 in addition to exposure mechanisms including the taking lens 14, a frame counter mechanism, and a one-frame film advancing mechanism including the film advancing wheel 18. The rear cover 27 is removably attached to the rear of the main body 26 to cover the photographic film 30a light-tightly. The front cover 29 having the shutter release button 16, a finder objective window 21, and a taking lens window 22 is removably attached to the front of the main body 26 to cover the mechanism unit 28.

The main body 26 has a film take-up chamber or cassette chamber 33 for holding a cassette shell 30b of the film cassette 30 and a film supply chamber or film roll chamber 34 for holding the photographic film 30a in rolled condition which has been pulled out from the cassette shell 30b and coiled in a roll 30d. Because the film advancing wheel 18 is engaged with a spool 30c of the cassette shell 30b and the photographic film 30a is secured at one end to the spool 30c, the film 30a may be wound back into the cassette shell 30b one frame at a time by rotating the film advancing wheel 18 after each exposure.

The cassette chamber 33 and the film roll chamber 34 have open bottoms, which are closed by bottom lids 35 and 36 formed integrally with the rear cover 27. The bottom lid 36 is used for inserting a tool when winding the photographic film 30a into the roll 30d. The bottom lid 35 is used for removing the cassette shell 30b after the exposed photographic film 30a has been completely wound back into the shell 30b. An opening 37 in the rear cover 27 is provided for exposing the film advancing wheel 18 to the outside. Between the cassette chamber 33 and the film roll chamber 34, an exposure frame 38 is disposed to bound a rectangular exposure aperture 39 of 24 mm×36 mm. A shading ridge 40 is formed around the exposure aperture 39 and protrudes forward from the exposure frame 38. A side portion 40a of the shading ridge 40 is formed as a part of the side wall of the film roll chamber 34, so as to reduce the length of the main body 26 in the horizontal direction.

Figure 3:
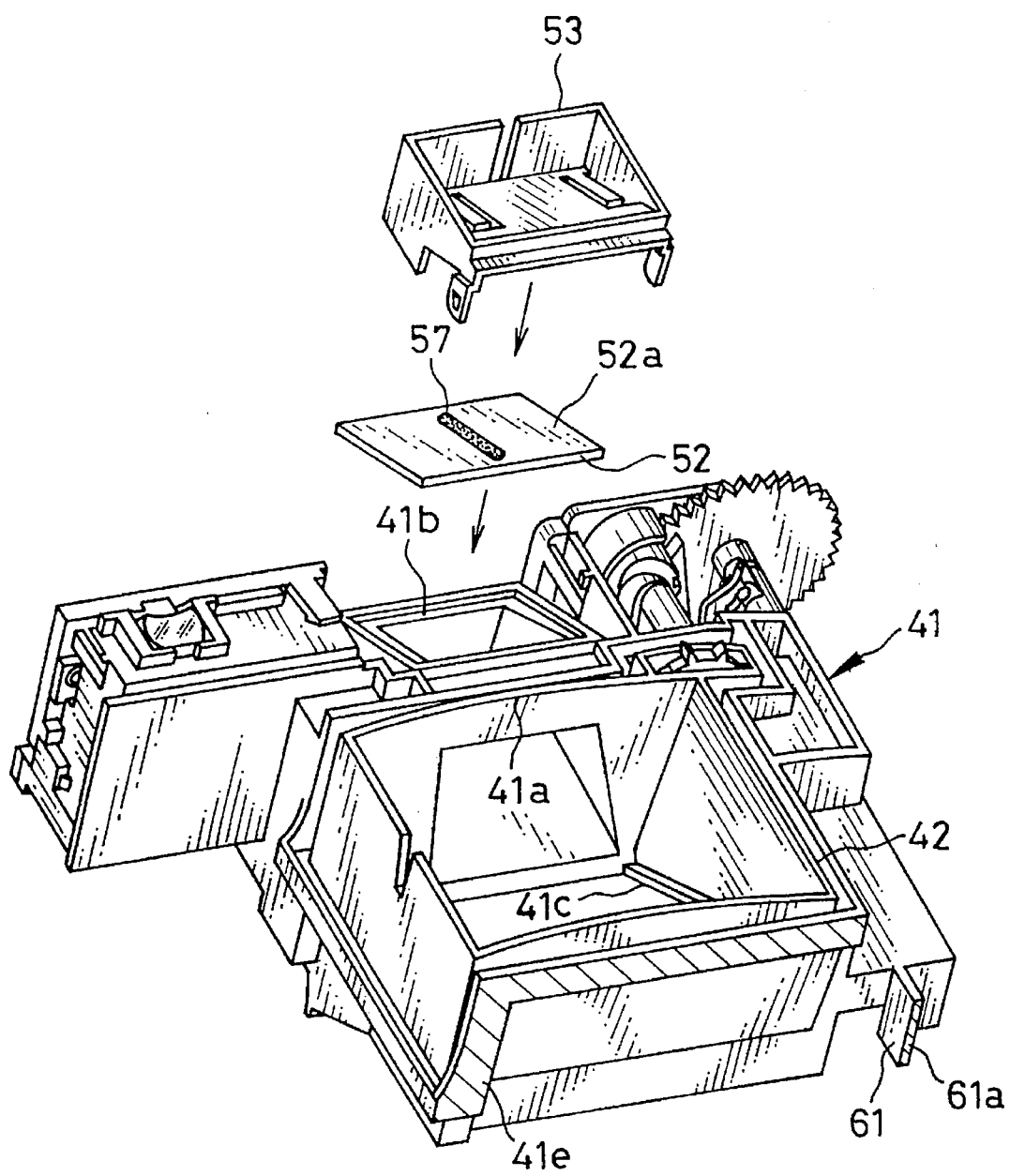
FIG. 3 is a partly exploded rear perspective view of a mechanism unit of the film unit shown in FIG. 2.

As shown in FIG. 3, an exposure chamber 41 is integrally formed with a base body for mounting the above-mentioned mechanisms of the mechanism unit 28 thereon. A groove 42 is formed around a rear window 41a of the exposure chamber 41, and the shading ridge 40 is fitted into the groove 42 when the mechanism unit 28 is attached to the front of the exposure aperture 39, so that light from the taking lens 14 falls on the photographic film 30a disposed behind the exposure aperture 39.

Referring again to FIG. 2, a top plate 27a is integrally formed with the rear cover 27 to cover a top center portion of the mechanism unit 28 in assembled position. In correspondence with the top plate 27a, a top wall portion 29a of the front cover 29 has a cutout 29b behind a lens hood portion 43. This construction permits removal of the lens hood portion 43 from a mold used to form the front cover 29. This is because the top of the lens hood portion 43 bulges above the top wall portion 29a, so that the front cover 29 could not otherwise be removed from the mold. For the same reason, the slot 20, having an upwardly extending margin, is formed by joining slot halves 20a and 20b which are respectively formed on the rear and front covers 27 and 29. A finder ocular window 44 is formed through the rear cover 27.

Figure 4:
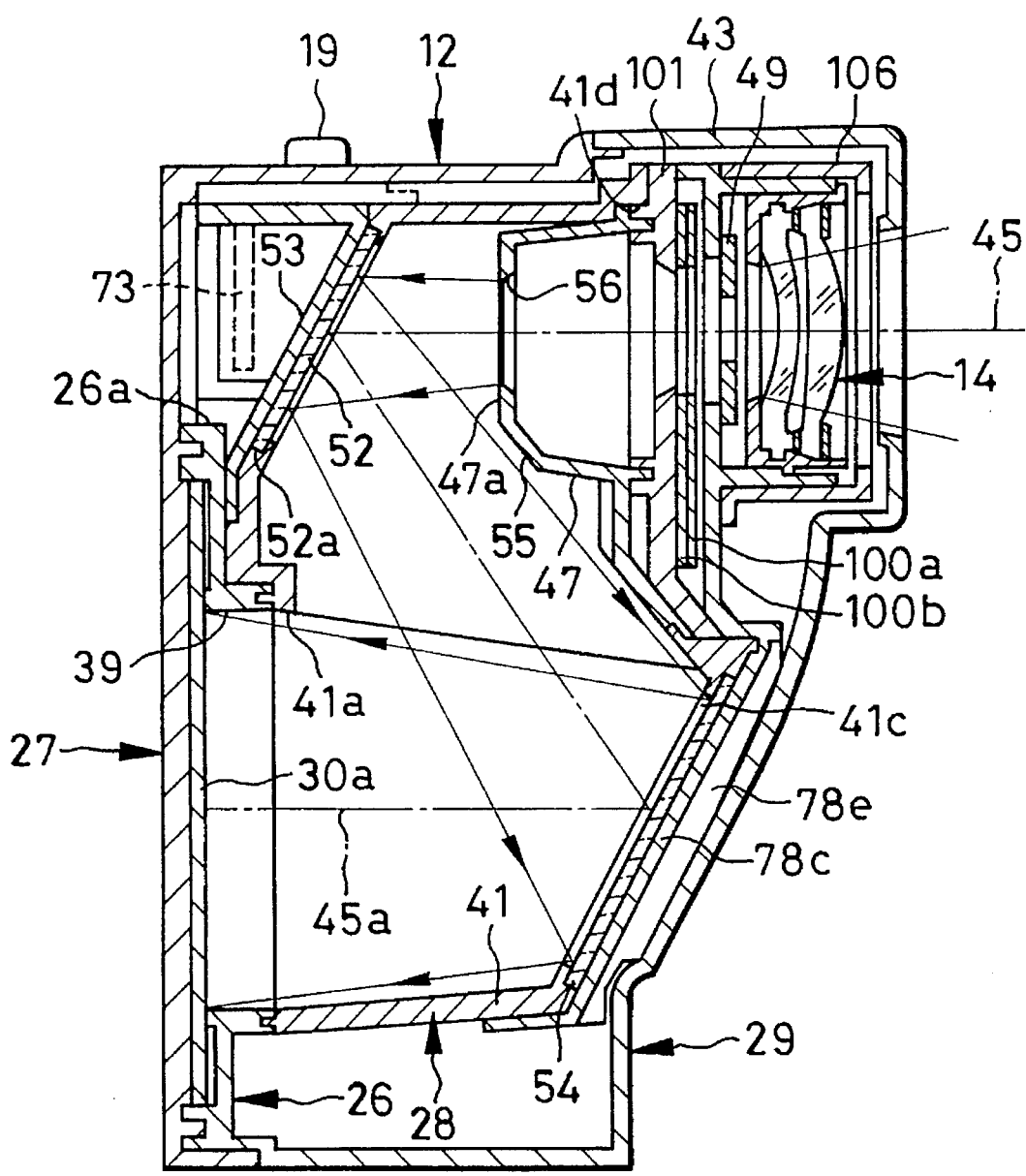
FIG. 4 is a vertical cross section of the unit body shown in FIG. 2.
Figure 5:
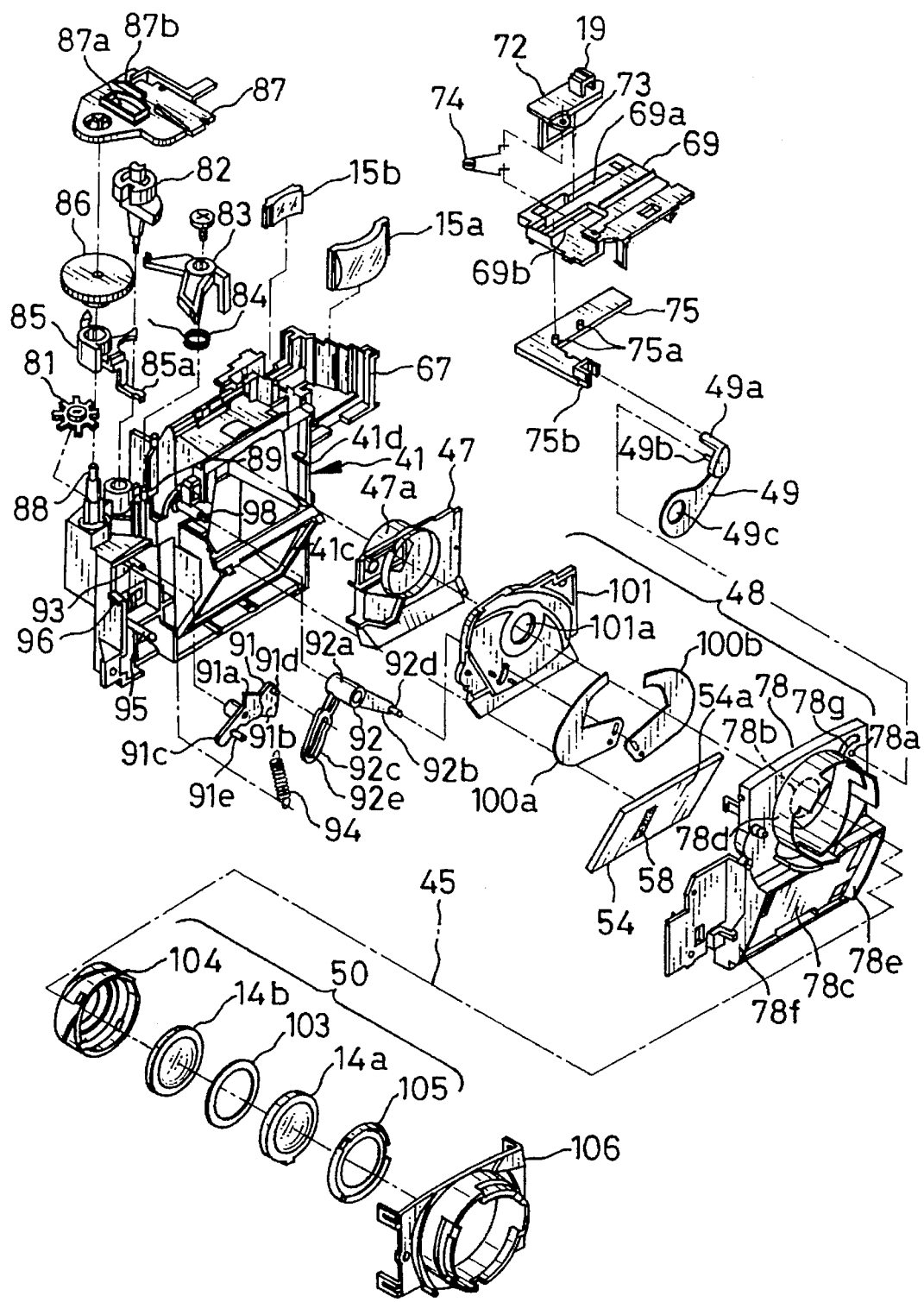
FIG. 5 is an exploded front perspective view of the mechanism unit shown in FIG. 3.

Referring to FIGS. 3 to 5, the exposure chamber 41 has the rear window 41a, a rear oblique window 41b formed above the rear window 41a oblique to the optical axis 45 of the taking lens 14, a front oblique window 41c formed in front of the rear window 41a parallel to the oblique window 41b, and a front window 41d. A cover plate 47, a shutter unit 48, a lens aperture changing lever 49 and a lens unit 50 are mounted in the front window 41d in this order from inside.

A mirror 52 is attached to the rear oblique window 41b and is secured by a mirror holding member 53, whereas a mirror 54 is attached to the front oblique window 41c. To obtain a long light path, the mirror 54 is disposed below the taking lens 14, and thus protrudes forwardly from the front wall portion 29c. The optical axis 45 of the taking lens 14 is reflected by the mirrors 52 and 54 into a Z-shape, to reach the photographic film 30a disposed behind the rear window 41a and the exposure opening 39. Since the light flux spreads after passing through the taking lens 14, the lower mirror 54 is larger than the upper mirror 52. Because the mirrors 52 and 54 are mounted in parallel to each other, the optical axis 45a of the light incident on the photographic film 30a is also parallel to the optical axis 45 of the taking lens 14.

A light-shielding barrel 47a is formed integrally with the cover plate 47 to mask stray or extraneous light outside the effective angle of view. As described above, the lens aperture is enlarged in the night photography mode. Therefore, the spread of the light flux from the taking lens 14 is enlarged correspondingly, and the extraneous light is increased. To mask the extraneous light effectively, an opening 56 of the light-shielding barrel 47a which allows only the effective light to pass therethrough, is disposed as near to the upper mirror 52 as possible without interfering with the effective light traveling from the mirror 52 to the mirror 54. A lower inside corner 55 of the light-shielding barrel 47a is diagonally disposed so as not to interfere with the effective light. The opening 56 has a rectangular shape similar to that of the exposure frame 38.

The mirrors 52 and 54 are highly reflective mirrors. The highly reflective surface of the mirror 52, 54 is comprised by a titanium oxide layer, a cerium oxide layer and an aluminum layer deposited in that order on one surface of a glass base plate, and has an albeds of 85% or more for light of 700 mm wavelength. Because it is not easy to distinguish between the reflective surface and the back surface of the glass base plate or the back surface of the mirror 52, 54, marks e.g. lines 57 and 58 are provided on the back surfaces 52a and 54a of the mirrors 52 and 54 by using such black or blue ink as is disclosed in Japanese Patent No. 242494, which has no effect on the photographic film 30a. Thereby, the mirrors 52 and 54 are properly mounted in the windows 41a and 41c of the exposure chamber 41 without fail.

Because the mirrors 52 and 54 are mounted on the exposure chamber 41 before the exposure chamber 41 is attached to the main body 26, the bottom edge 52a of the upper mirror 52 may be disposed below the top edge 26a of the main body 26. As a result, the height of the unit body 12 is reduced.

As shown in FIG. 3, the exposure chamber 41 has a bottom rim 41e indicated by hatching, and a leg 61 is formed on the bottom of the base body of the mechanism unit 28. As the bottom surface 61a of the leg 61 is coplanar with the bottom surface of the bottom rim 41e, the base body of the mechanism unit 28 and thus the exposure chamber 41 can rest stably on the bottom rim 41e and the leg 61. Therefore, mounting of the mirrors 52 and 54 on the exposure chamber 41 can be performed easily.

As shown in FIG. 5, the base body of the mechanism unit 28 includes a finder lens frame 67 holding a convex objective lens 15a and a concave ocular 15b in predetermined positions, which constitute a Galilean optical system of the viewfinder for magnifying the field of view corresponding to the telephotographic taking lens 14. The finder lenses 15a and 15b are, for example, formed from plastic, and are inserted from above into the finder lens frame 67 and are securely held by a finder top plate 69, which is removably attached to the top of the finder lens frame 67 in light-tight fashion.

Figure 6:
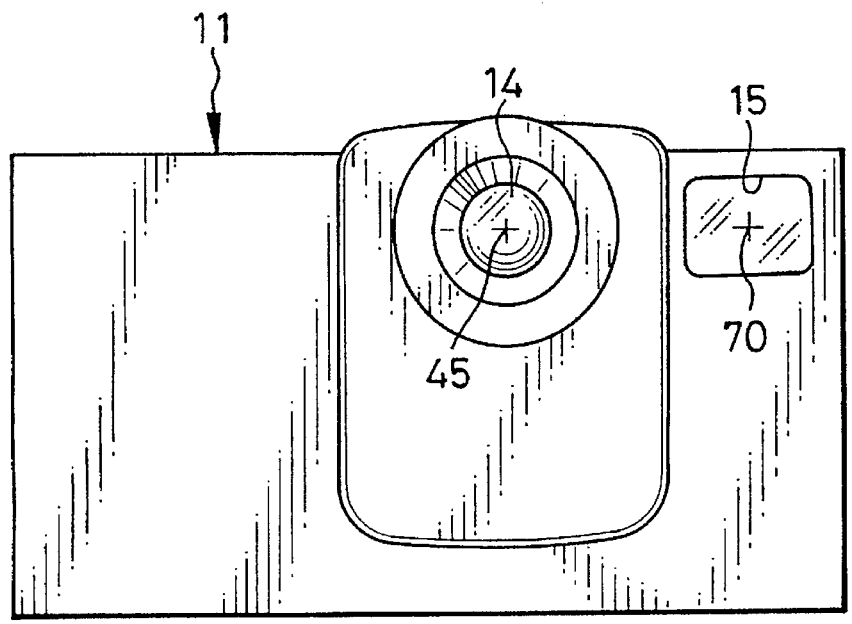
FIG. 6 is a front view of the film unit shown in FIG. 1.

The lenses 15a and 15b are disposed between the finder objective window 21 and the finder ocular window 44 to form the viewfinder 15. The optical axis 70 of the viewfinder 15 is disposed at the same height as the optical axis 45 of the taking lens 14, as is shown in FIG. 6, so that parallax is minimized even in a near subject distance range.

A mode switching plate 72 is mounted on the finder top plate 69, the mode switching knob 19 and the above mentioned ND or color filter 73 are formed integrally on the top and bottom sides of the mode switching plate 72 respectively. The filter 73 is inserted in a slot 69a in the finder top plate 69 to be slidable in a direction perpendicular to the optical axis 70. When the mode switching knob 19 is moved into the daylight photography mode position, the mode switching plate 72 is slid with it to insert the filter 73 between the objective lens 15a and the ocular 15b of the viewfinder 15, preferably nearer the ocular 15b. The plate 72 is urged by a toggle spring 74 over center toward either of the daylight and the night photography mode positions in alternative fashion.

When the filter 73 is inserted in the viewfinder 15, the filter 73 reduces light entering the objective lens 15a to such an extent that, so long as the photographer can see the subject through the viewfinder 15, the subject may be photographed under proper exposure conditions in the daylight photography mode. If the subject cannot be viewed through the viewfinder 15 in the daylight photography mode, the photographer understands that the night photography mode should be selected. Therefore, even a beginning photographer can appropriately select either the daylight or the night photography mode.

The lens aperture changing lever 49 is moved in cooperation with the finder filter mechanism by an interconnection plate 75. The interconnection plate 75 is mounted between the finder top plate 69 and the finder lens frame 67 so as to be movable in a direction perpendicular to the optical axis 70. To reduce the amount of movement of the lens aperture changing lever 49 compared with that of the mode switching plate 72, the interconnection plate 75 is coupled to the mode switching plate 72 through a slot 69b in the finder top plate 69 such that a pair of pins 75a formed on the top surface of the interconnection plate 75 are inserted in the slot 69b and are moved by a pin formed on the bottom surface of the mode switching plate 72. A channel-like end 75b of the interconnection plate 75 receives a pin 49a formed on an upper tip of the lens aperture changing lever 49.

The pin 49a is engaged in the channel-shaped end 75b through a slot 78g in a shutter cover 78, and a pivot 49b of the lens aperture changing lever 49 formed below the pin 49a is inserted in a bearing hole 78a in the shutter cover 78, so that the pin 49a may move through the slot 78g along with the interconnection plate 75. An aperture 49c is formed on a lower end portion of the lens aperture changing lever 49. The aperture 49c is, for example, 2 mm to 3 mm in diameter, and is disposed between the shutter unit 48 and the lens unit 50 coaxially with the optical axis 45 of the taking lens 14 when the daylight photography mode is selected by operating the mode switching knob 19, thereby to define the small lens aperture. In the night photography mode, the lens aperture changing lever 49 is retracted from the light path.

A sprocket wheel 81, a cam unit 82, an arresting lever 83, a spring 84, a shutter actuating lever 85 and a frame number dial 86, which constitute the shutter cocking mechanism, the one frame film advancing mechanism and the frame counter mechanism, are mounted on the base body of the mechanism unit 28 and cooperate with each other. The shutter actuating lever 85 and the frame number dial 86 are pivotally mounted on an axle 88. A transparent plastic cover plate 87 is mounted on the tip of the axle 88 to retain these members 85 and 86 on the axle 88. The cover plate 87 has a frame number magnifying convex lens 87a and a guide rail 87b formed integrally therewith. The guide rail 87b is used for guiding the rear cover 27 when joining the rear cover 27 to the front cover 29.

An axle of the cam unit 82 is fitted in the sprocket wheel 81, and the cam unit 82 and the sprocket wheel 81 are rotated by the movement of the photographic film 30a. When the cam unit 82 is rotated, the shutter actuating lever 85 and the arresting lever 83 rotate clockwise as shown in FIG. 5. As a result, the arresting lever 83 locks the cam unit 82, and holds the shutter actuating lever 85 in a cocked position. The spring 84 urges the arresting lever 83 to rotate clockwise and the shutter actuating lever 85 to rotate counterclockwise. One revolution of the cam unit 82 makes the frame number dial 86 advance one unit.

When the shutter release button 16 is depressed in this cocked position, the arresting lever 83 is rotated in the counterclockwise direction, thereby unlocking the film advancing mechanism, and the shutter actuating lever 85 is rotated in the counterclockwise direction under the force of the spring 84 to return to the initial position. At that time, a leg 85a of the shutter actuating lever 85 strikes an upper claw 91a of a first connection lever 91.

The first connection lever 91 transmits the movement of the shutter actuating lever 85 to the shutter unit 48 through a second connection lever 92. The first connection lever 91 can swing about an axle 93 which is parallel to the optical axis 45. The first connection lever 91 has a sector arm 91b and a projection 91c on opposite sides of the axle 93. The sector arm 91b is of a sector-shape for preventing the fluttering of the second connection lever 92 and extends in a vertical plane offset slightly forward from the rest of the lever 91. A connection pin 91d is provided on the front surface of the sector arm 91b, and is connected to the second connection lever 92.

A spring 94 is suspended between a pin 91e formed on the projection 91c and a pin 95 formed on the exposure chamber 41, to urge the first connection lever 91 to rotate in the counterclockwise direction. A stop 96 is formed on the exposure chamber 41 to contact the projection 91c and stop the rotation of the first connection lever 91 against the force of the spring 94.

The second connection lever 92 has a bearing portion 92a which is pivotally fitted on an axle 93 parallel to the optical axis 45, and has two arms 92b and 92c extending radially from the bearing portion 92a. The arm 92b has a connection pin 92d which engages with a pair of shutter blades 100a and 100b of the shutter unit 48. The arm 92c slides on the sector arm 91b while the pin 91d of the sector arm 91b rides in a cam slot 92e in the arm 92c. With respect to the optical axis 45, the arm 92b is offset forward from the arm 92c so that the second connection lever 92 can transmit the movement of the first connection lever 91 to the shutter blades 100a and 100b which are disposed forwardly of the first connection lever 91.

The shutter unit 48 is constituted of a shutter base 101, the shutter blades of identical shape 100a and 100b, and the shutter cover 78. Coaxially with the optical axis 45, the shutter base 101 has a shutter aperture 101a and the shutter cover 78 has an aperture 78b to define the above-mentioned large lens aperture, which is larger than the lens aperture 49c of the lens aperture changing lever 49. For example, the large lens aperture 78b is about 5 mm to 6 mm in diameter. The shutter cover 78 also has a mirror cover portion 78c integrally formed therewith, for covering the back surface 54a of the highly reflective mirror 54. Also a lens barrel portion 78d is integrally formed with the shutter cover 78, surrounding the lens aperture 78b and protruding forwardly to receive the lens unit 50 therein. The lens aperture changing lever 49 may protrude into the lens barrel portion 78d through a not-shown slot formed through the lens barrel portion 78d.

The lens unit 50 is constituted of two plastic lenses 14a and 14b and a spacer ring 103 disposed between these lenses 14a and 14b, which are held in a lens frame 104 and fixed therein by a lens holder 105. The lens frame 104 has three spiral ridges on the outer periphery thereof which are engaged with three spiral grooves formed on the inside surface of the lens barrel portion 78d. The three ridges have a plurality of stepped portions with which three hooks of a lens unit holder 106 are engaged such that the lens unit 50 may be moved stepwise in the direction of the optical axis 45 to precisely adjust the focus of the taking lens 14.

The mechanism unit 28 having the above-described construction is attached to the main body 26, and thereafter, the front cover 29 is attached to the main body 26 through engagement between hooks 33a and 34a of the main body 26 and hooks 29e of the front cover 29. In the assembled position, the mechanism unit 28 contacts the inside of the front cover 29 only along right and left flanges 78e and 78f which protrude forward from the mirror cover portion 78c of the lens cover 78. As shown in FIG. 4, the structure in the vicinity of the taking lens 14 does not contact the front cover 29, so that the taking lens 14 will not be affected by external impacts on the lens hood portion 43 of the front cover 29.

Figure 7:
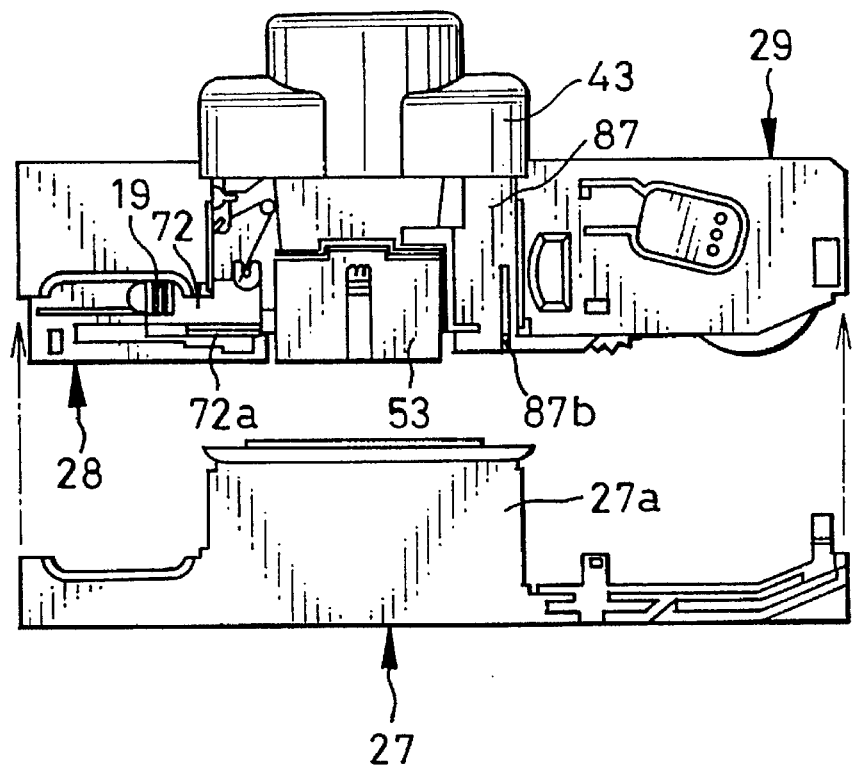
FIG. 7 is an exploded top plan view of the unit body, explaining the assembling process of the rear cover.
Figure 8:
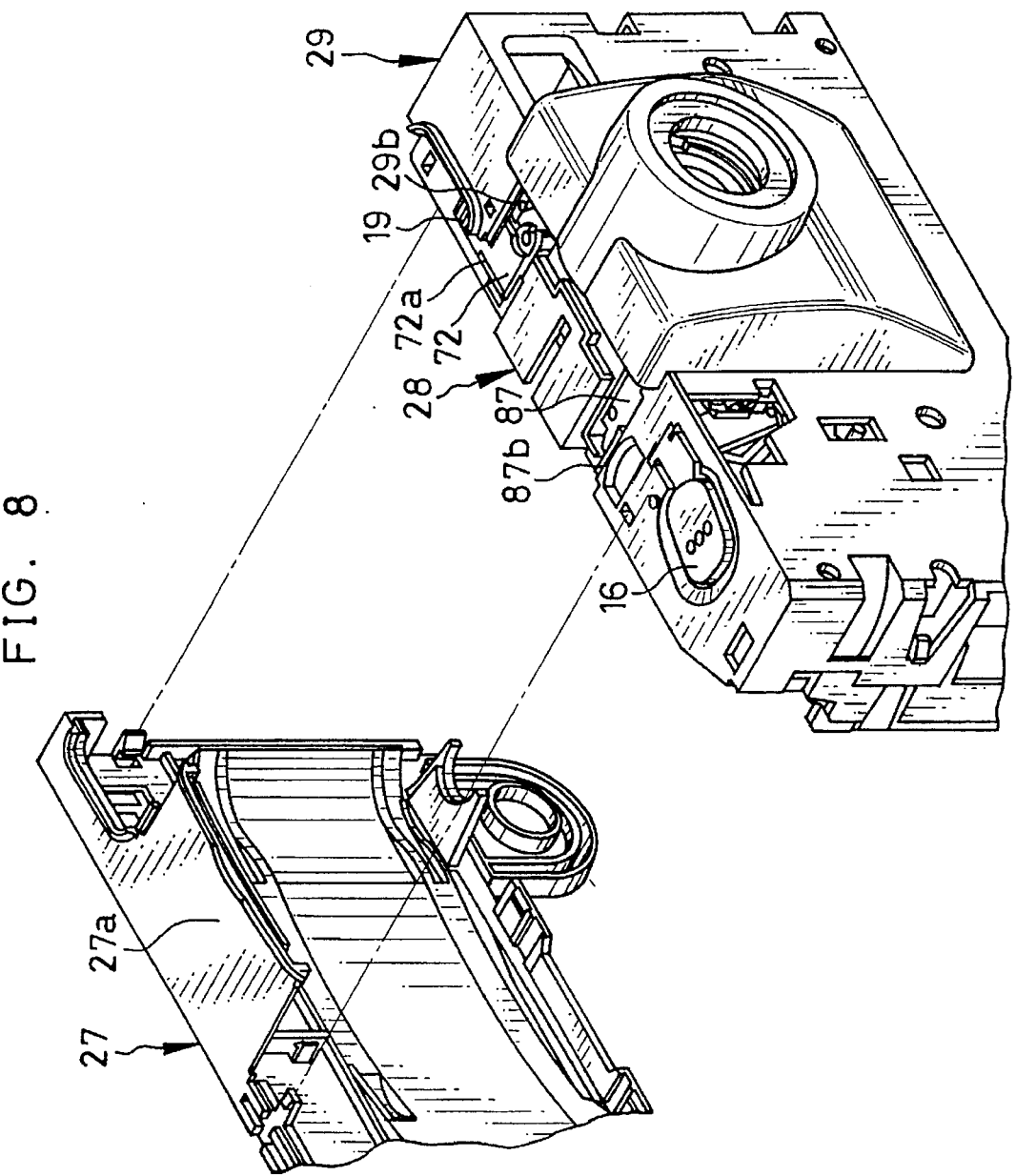
FIG. 8 is an exploded fragmentary perspective view of the unit body, explaining the assembling process of the rear cover.

After the front cover 29 is attached to the main body 26, the rear cover 27 is attached such that the top plate 27a is inserted in the cutout 29b of the front cover 29 in a direction parallel to the optical axis 45, as is shown in FIGS. 7 and 8. Because the top plate 27a is guided by the guide rail 87b as well as on the top surface of the mode switching plate 72, the insertion of the top plate 27a into the cutout 29b may be smoothly performed. For this purpose, the mode switching plate 72 is made from a silicone mixed plastic material and has a tapered surface 72a in a rear top portion thereof. In addition to this construction, the top surface of the mode switching plate 72 may have low relief and may be made rough. During the assembly of the rear cover 27, the mode switching knob 19 is set in the night photography mode position so as to place the mode switching plate 72 in the path of the top plate 27a, as is shown in FIGS. 7 and 8.

The assembled unit body 12 is encased in the outer casing 13, and the mode switching knob 19 is set in the daylight photography mode position before being packed in a moisture- and heat-proof envelope. The ordinary photographer would recognize from a glance at the symbols 13a and 13b on the outer casing 13 that the film unit 11 is changeable between daylight and night photography modes, when the photographer opens the envelope and removes the film unit 11.

Even if the photographer does not recognize the film unit 11 as mode-changeable type, the photographer may notice the difference of the film unit 11 from conventional telephoto-type film units when the photographer views through the viewfinder 15 a photographic field whose brightness is reduced from the actual level, since the film unit 11 is normally set in the daylight photography position, and thus the filter 73 is inserted between the objective lens 15a and the ocular 15b of the viewfinder 15. Thus alerted, the photographer would read the information printed on the outer casing 13 and recognize the film unit 11 as being of the mode-changeable type.

To take a picture, first the film advancing wheel 18 is rotated to cock the shutter. Thereafter when the shutter button 16 is depressed, the arresting lever 83 causes the shutter actuating lever 85 to strike the upper claw 91a and rotate the first connection lever 91 in the clockwise direction. Thereby, the connection pin 91d is moved downward along the cam slot 92e to cause the second connection lever 92 to rotate in the counterclockwise direction. As a result, the shutter blades 100a and 100b are opened.

While the leg 85b strikes the claw 91a, the connection pin 91d reaches the lower end of the cam slot 92e, and the shutter blades 100a and 100b are maintained opened. As soon as the leg 85b passes over the claw 91a, the first connection lever 91 is moved toward the initial position under the force of the spring 94, and the connection pin 91d is moved toward the upper end of the cam slot 92e. Thereby, the second connection lever 92 is rotated in the clockwise direction, to swing the shutter blades 100a and 100b to a closed position. When the first connection lever 91 has returned to the initial position, the shutter blades 100a and 100b are closed, and the projection 91c is stopped against the stop 96, so that the first connection lever 91 is prevented from bouncing.

In the daylight photography mode, the light entering through the taking lens 14 passes through the small lens aperture 49c and the shutter aperture 101a, so long as the shutter blades 100a and 100b are open. The light passes through the light-shielding barrel 47a and is reflected from the upper mirror 52 toward the lower mirror 54, and then from the lower mirror 54 toward the exposure aperture 39 to expose the photographic film 30a. Because of the small lens aperture 49c, the exposure amount is suitable for a high brightness subject.

If the photographer cannot clearly view the subject through the filter 73, the mode switching knob 19 is switched to the night photography mode. Thereby, the mode switching plate 72 is slid to retract the filter 73 from the optical path of the viewfinder 15 perpendicularly to the finder optical axis 70. In cooperation with the sliding of the mode switching plate 72, the lens aperture changing lever 49 is rotated to be retracted counterclockwise from the optical path of the taking lens 14.

Retraction of the filter 73 permits a low brightness subject to be viewed through the viewfinder 15. When the shutter button 16 is depressed in this night photography mode position, the light passes through the large lens aperture 78b to expose the photographic film 30a. The consequent exposure amount is suitable for a low brightness subject.

In this way, the photographer can appropriately select either the daylight or the night photography mode before or after advancing the photographic film by one frame after each exposure. When all available frames have been exposed, the film unit 11 is forwarded to a photographic laboratory, without removing the film cassette 30 therefrom. In the photographic laboratory, the film cassette 30 is removed from the unit body 12, and the exposed photographic film 30a is removed from the cassette shell 30b for development and printing. The resulting photographic prints and the developed photographic film 30a are returned to the photographer. The empty unit body 12 is recovered by the manufacturer for recycling or reuse.

The recovered unit body 12 is disassembled into the rear cover 27, the front cover 29 and the main body 26. Then, the mechanism unit 28 is detached from the main body 26 and is inspected. So long as the results of the inspection are good, the mechanism unit 28 is transported to a film unit assembly line to be reused in a new film unit. The rear and front covers 27 and 29 and the main body 26 are recycled as scrap material.

Figure 9:
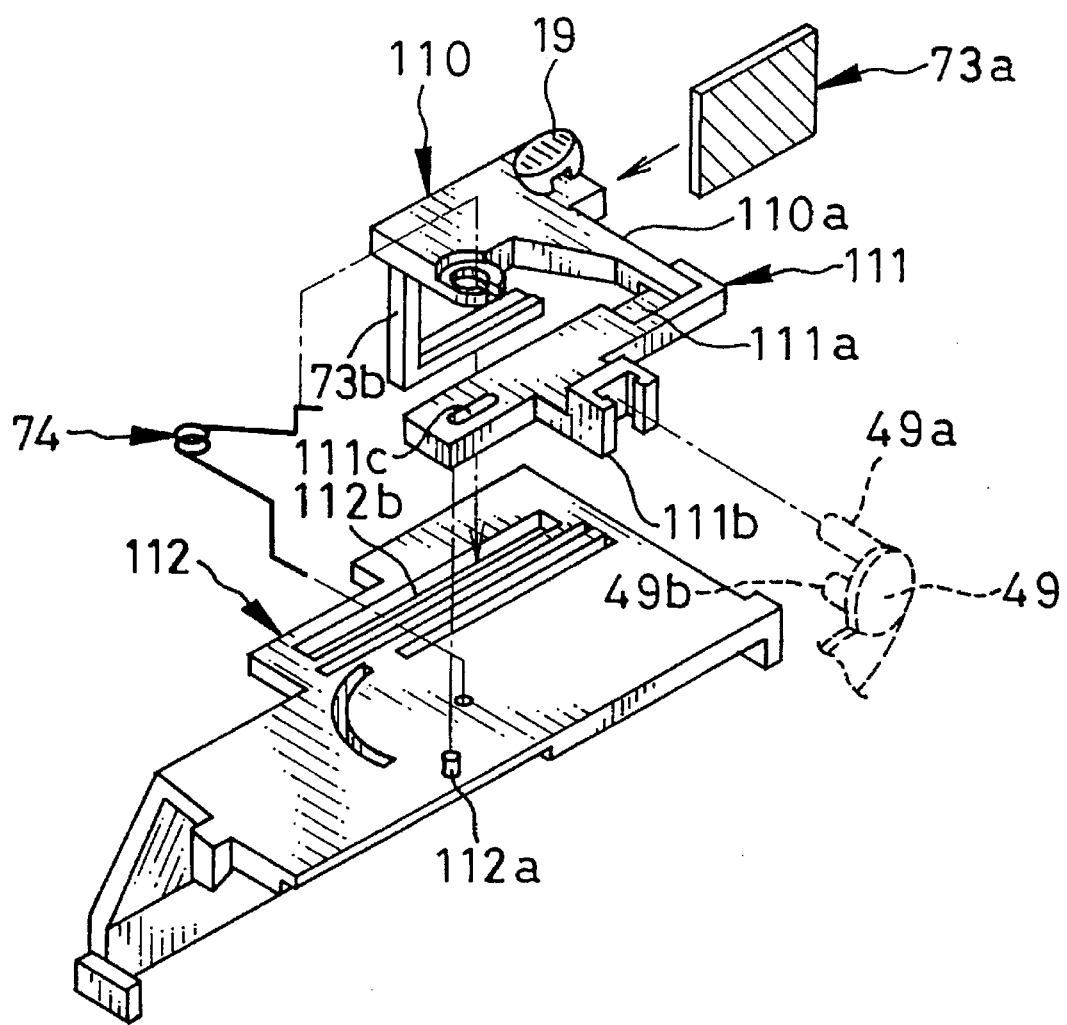
FIG. 9 is an exploded perspective view of a photography mode switching mechanism according to another preferred embodiment of the present invention.

Although the filter 73 is integrally formed with the mode switching plate 72 in the above-described embodiment, it is possible to form a filter 73a separately, as shown in FIG. 9, and to fit the filter 73a into a filter frame 73b which is formed integrally with a mode switching plate 110. The mode switching knob 19 may also be formed separately and secured to the mode switching plate 110. According to the embodiment shown in FIG. 9, an interconnection plate 111 is disposed on the upper side of a finder top plate 112, and an arm 110a of the mode switching plate 110 is engaged in a recess 111a of the interconnection plate 111. Because the arm 110a is slidable in the recess 111a, the movement of the mode switching plate 110 causes the interconnection plate 111 to move by a lesser amount than the plate 110 in either direction. The interconnection plate 111 is connected to a lens aperture changing lever 49 through engagement between a channel-like connection 111b and a pin 49a on the lever 49. The interconnection plate 111 slides on the finder top plate 112 along with the movement of the mode switching plate 110, while being guided by a pin 112a on the finder top plate 112 which is engaged in a slot 111c in the interconnection plate 111. Thereby, the lens aperture changing lever 49 is swung about a pivot 49b in the same way as described above. Other constructions may be equivalent to those of the above-described embodiment.

FIGS. 10 to 14 show a film unit according to another preferred embodiment, wherein the same reference numerals as used in the above-described embodiment designate equivalent parts throughout the several views, so that the description as set forth below may be limited to those parts which are individual to this embodiment.

Figure 10:
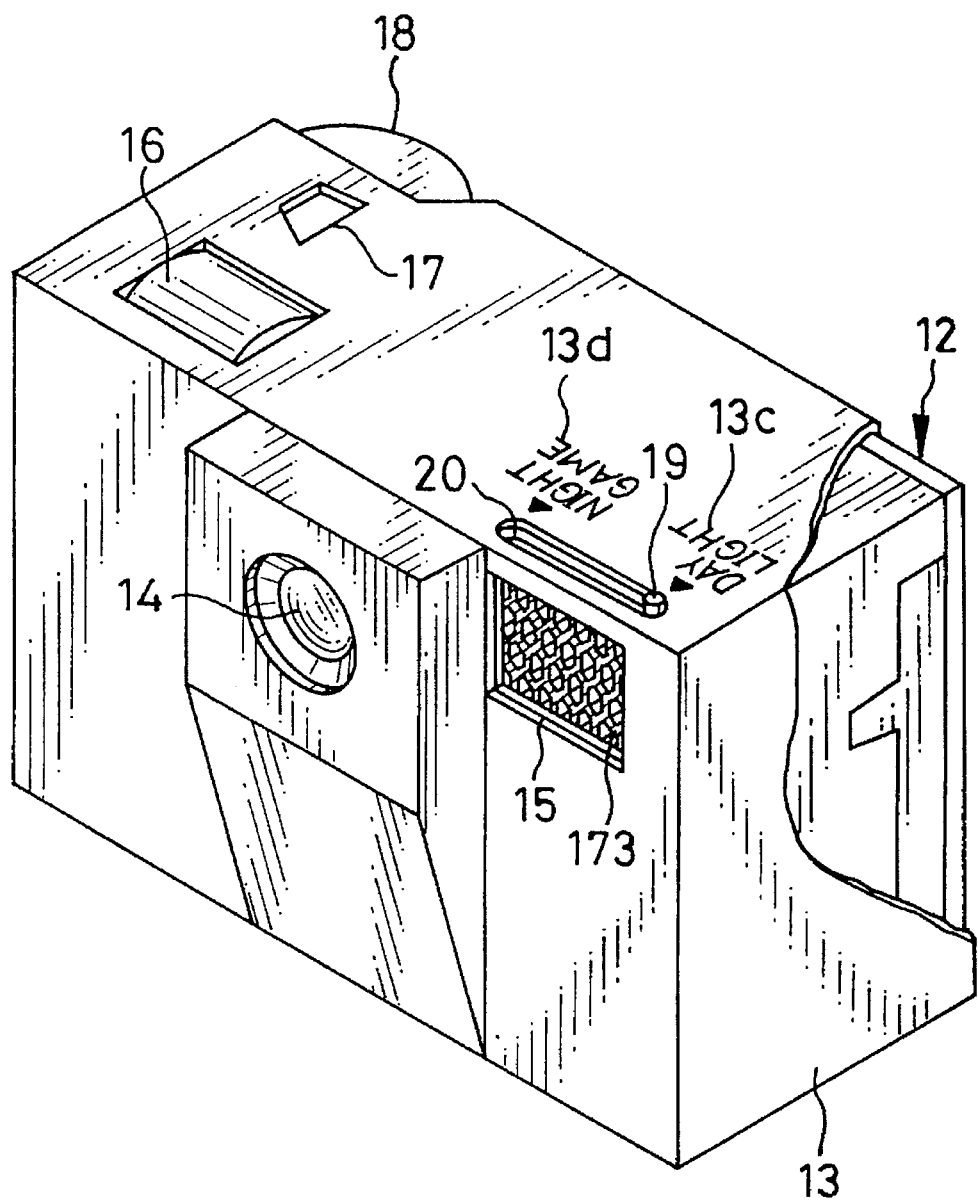
FIG. 10 is a perspective view of a telephoto-type film unit according to another preferred embodiment of the invention.

As shown in FIG. 10, a unit body 12 is designed to be used while encased in an outer casing 13. A mode switching knob 19 is slidably mounted on a top portion of the unit body 12 so that the photographer may change the lens aperture size between a daylight photography mode and a night game photography mode. In the night game photography mode, the lens aperture is set to a size suitable for taking pictures of night games, such as baseball or soccer games played at night under night lights. However, the aperture size of the night game mode is suitable for photography in cloudy daylight. To indicate a daylight photography mode position and a night game photography mode position of the mode switching knob 19, index marks with corresponding characters 13c and 13d are printed on the outer casing 13 at either end of a slot 20. In this embodiment, a taking lens 14 and a viewfinder 15 are disposed at the same height so as to minimize parallax.

Figure 11:
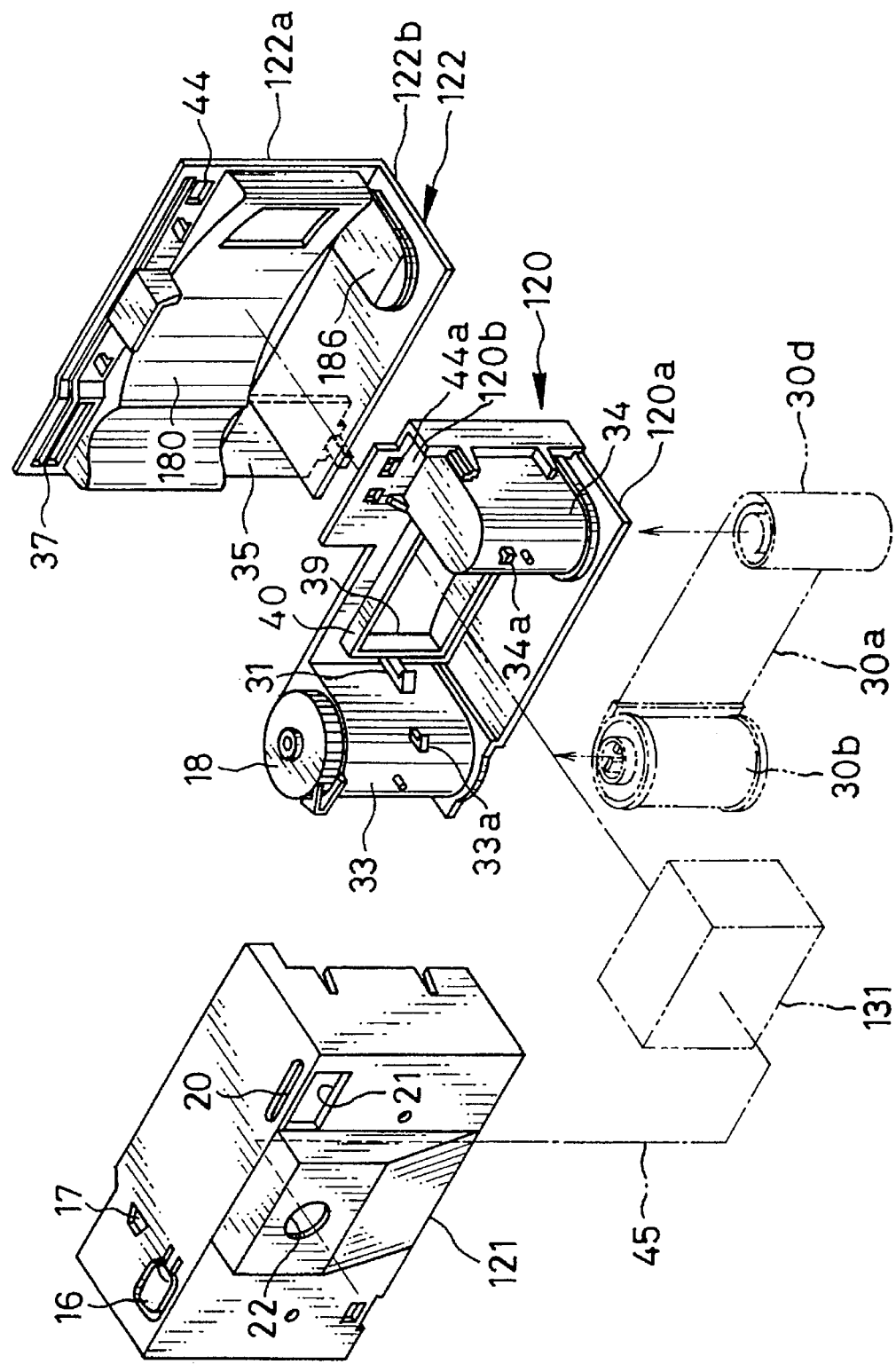
FIG. 11 is an exploded perspective view of the unit body of the film unit shown in FIG. 10.

As shown in FIG. 11, the unit body 12 is basically constituted of a main body 120, a front cover 121 and a rear cover 122, each of which is formed as an integral body. The main body 120 has a cassette chamber 33 and a film roll chamber 34 for containing a cassette shell 30b and a roll of photographic film 30d. The main body 120 also has a bottom wall portion 120a and a rear wall portion 120b. The rear surface of the rear wall portion 120b is used as a film supporting or guiding surface for guiding the front surface of a strip of photographic film 30a extending from the film roll 30d to the cassette shell 30b. An exposure opening 39 is formed through the rear wall portion 120b between the cassette chamber 33 and the film roll chamber 34, and a mechanism unit 131 is removably attached to the front of the exposure opening 39 by being secured by hooks 31 formed on the main body 120. A shading wall 40 is integrally formed around the periphery of the exposure opening 39, so as to shield ambient light from entering through a gap between the mechanism unit 131 and the main body 120.

Figure 12:
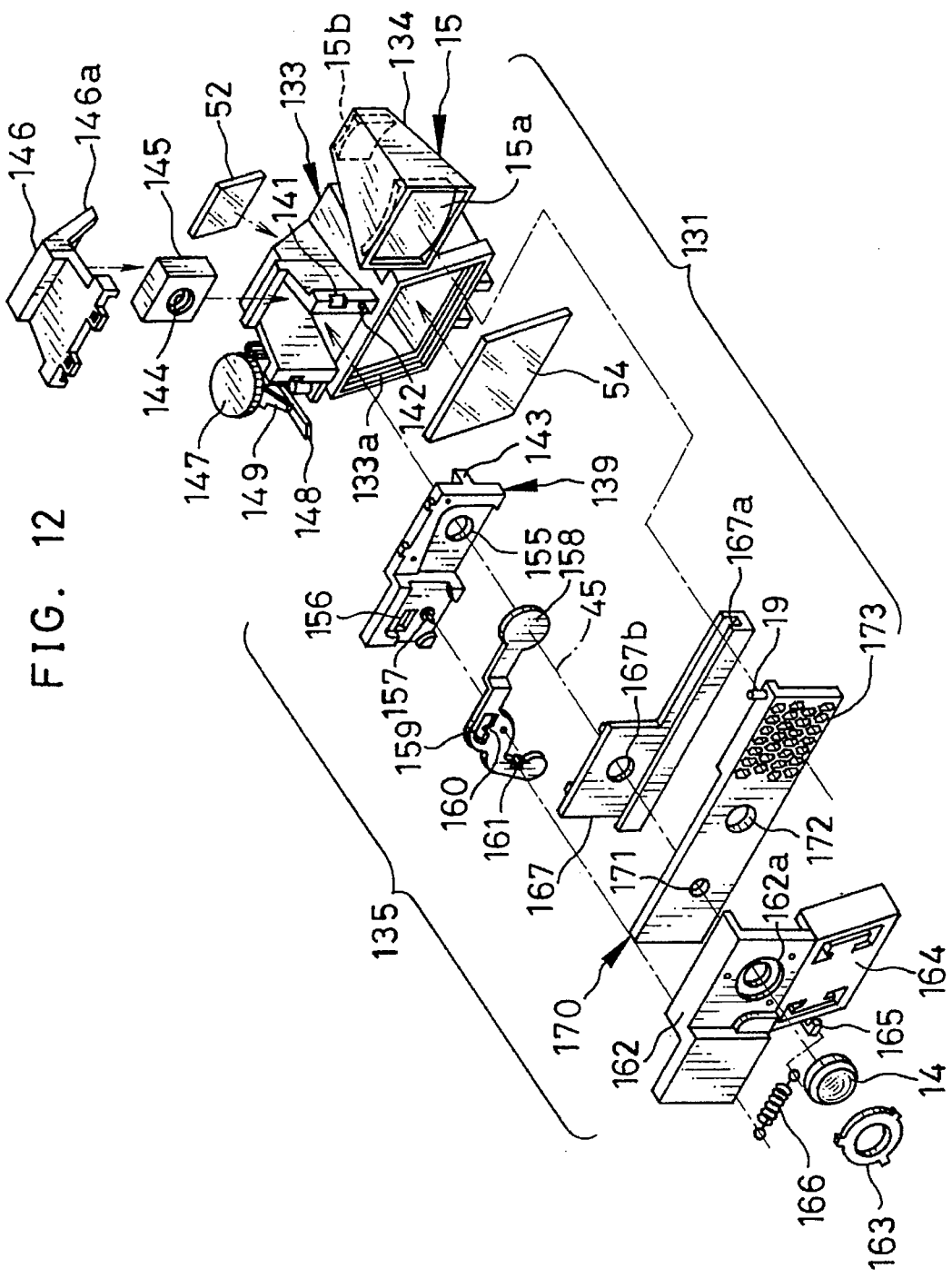
FIG. 12 is an exploded perspective view of a mechanism unit of the film unit shown in FIG. 10.
Figure 13:
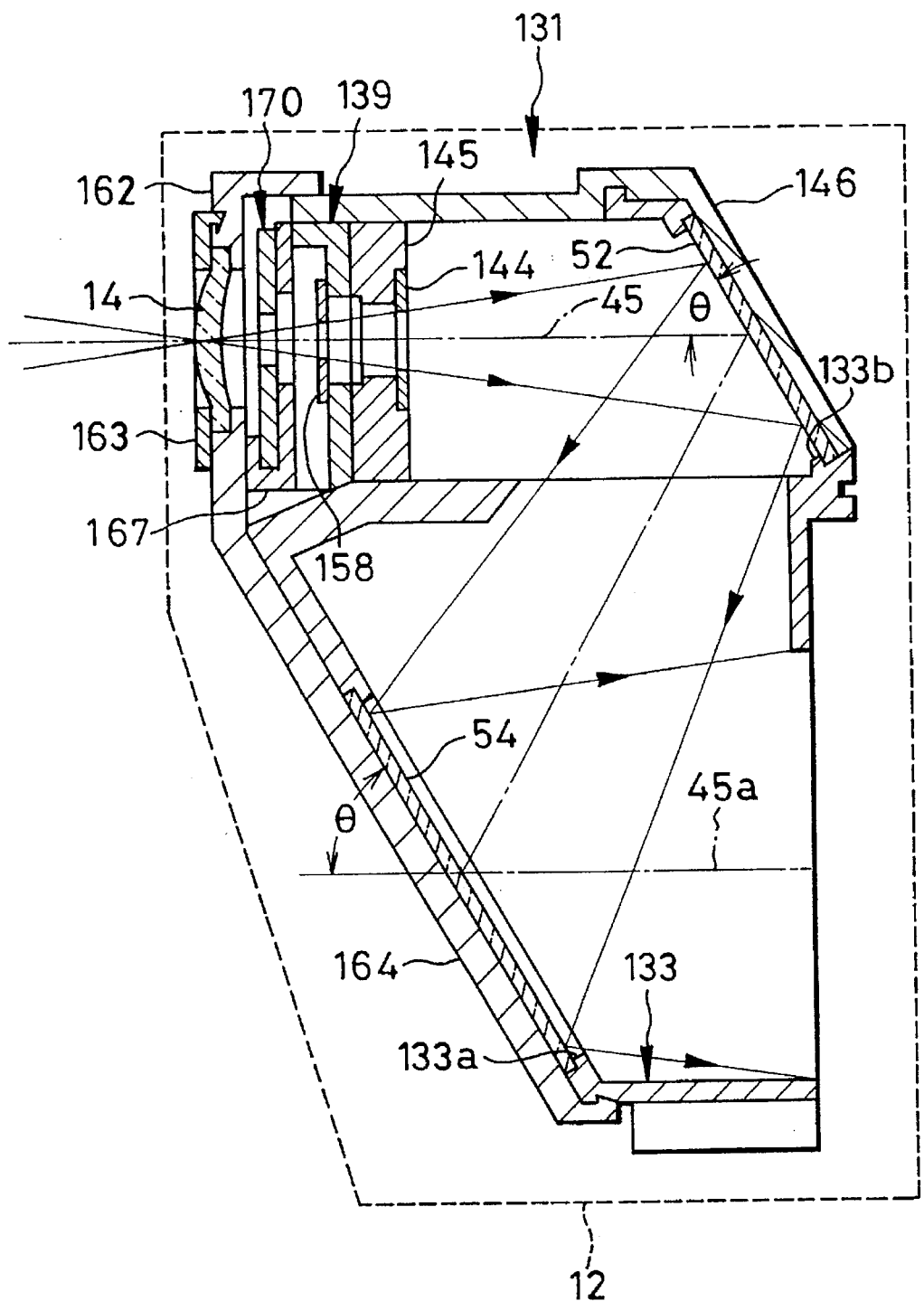
FIG. 13 is a vertical cross section of the mechanism unit shown in FIG. 12.

As shown in FIGS. 12 and 13, an exposure chamber 133, a viewfinder 15 and exposure mechanisms are incorporated in the mechanism unit 131. The exposure chamber 133 has a front oblique window 133a and a rear oblique window 133b. An upper mirror 52 and a lower mirror 54 are mounted in the rear and front oblique windows 133b and 133a, respectively, so as to provide a Z-shaped light path. Because the mirrors 52 and 54 are inclined at the same angle $\Theta$, e.g., 59.6° relative to the horizontal, the light falling on the photographic film 30a has a horizontal optical axis 45a. The viewfinder 15 is constituted of a convex objective lens 15a and a concave ocular 15b which are held in a finder barrel 134, and the finder barrel 134 is secured to one side of the exposure chamber 133.

A shutter unit 135 is secured in an upper front opening of the exposure chamber 133 through engagement between notches 141 or pin 142 formed on the exposure chamber 133, on one hand, and hooks 143 formed on a shutter base plate 139. A barrel 145 having a stray light shielding plate 144 is mounted behind the shutter base 139. Shutter unit 135 is disposed on an upper front portion of the exposure chamber 133, and a film advancing-and-shutter-cocking mechanism 136 is disposed on the opposite side of the exposure chamber 133 from the viewfinder 15. Thereafter, the upper side of the exposure chamber 133 is covered with a cover member 146 having a mirror-holding portion 46a integrally formed therewith, thereby covering the rear surface of the upper mirror 52. On the opposite side of the exposure chamber 133 from the viewfinder 15, a frame number dial 147, a shutter actuating lever 148, a shutter release lever 149 and other mechanisms for one-frame film advancing and shutter cocking are mounted.

The shutter base plate 139 has a circular opening 155, a rectangular opening 156 and a pin 157. A shutter blade 158 is pivotally mounted on the pin 157. The shutter blade 158 is formed with an opening 159 having a claw 160 formed in the middle of the lower edge of the opening 159 and projecting into the opening 159. A tip of the shutter actuating lever 148 extends through the rectangular opening 156 of the shutter base plate 139 and through the opening 159 of the shutter blade 158. The shutter blade 158 is urged to rotate counterclockwise under the force of a spring 166 whose one end is suspended on a pin 161 of the shutter blade 158, so that the shutter blade 158 normally closes the circular opening 155.

A shutter cover 162 is attached to the shutter base plate 139 so as to cover the shutter blade 158. The shutter cover 162 is formed with a recess 162a for receiving a single-element taking lens 14 made of transparent acrylic resin. The taking lens 14 is secured by a lens holder 163 which is secured to the shutter cover 162 through engagement between three hooks on the lens holder 163 in three holes formed around the recess 162a. The focal length of the taking lens 14 is about 70 mm to 80 mm, and the f-number is about f/11 to f/14. The shutter cover 162 has a mirror-holding portion 164 integrally formed therewith for covering the rear surface of the lower mirror 137. A pin 165 for suspending the other end of the spring 166 is formed on an edge portion of the mirror holding portion 164.

A guide plate 167 having a guide groove 167a and an aperture 167b is disposed between the shutter blade 158 and the shutter cover 162, and an aperture-stop plate 170 is mounted to be slidable along the guide groove 167a. The aperture-stop plate 170 has a small lens aperture 171, e.g., f/22, and a large lens aperture 172, e.g., f/11. The mode switching knob 19 is formed on the upper edge of the aperture-stop plate 170 integrally therewith, so that either of the lens apertures 171 and 172 may be placed in the optical path by operating the mode switching knob 19 to slide the aperture-stop plate 170. The aperture-stop plate 170 is positioned by a click-stop mechanism (not shown) in either of the respective photography mode positions. The aperture 167b is equal in size to the large lens aperture 172.

The aperture-stop plate 170 also has a filter portion 173 integrally formed therewith. The filter portion 173 has honeycomb structure openings and has a yellowish or reddish color, for instance a yellow color, so as to be distinctive. The filter portion 173 is inserted in front of the objective lens 15a of the viewfinder 15 to color the field of view yellow, when the small lens aperture 171 is placed in the light path, that is, when the daylight photography mode is selected. Although the aperture-stop plate 170 is formed as an integral body, the portion having the lens apertures 171 and 172 is formed from a black opaque resin, whereas the filter portion 173 is formed from a yellow semi-transparent resin.

In accordance with the above-described construction, the slot 20 for exposing the mode switching knob 19 to the outside and guiding it is formed through the top wall of the front cover 121 in the vicinity of the finder objective window 21, as is shown in FIG. 11. A finder ocular window 44 is formed through a rear wall portion 122a of the rear cover 122, and is aligned with an opening 44a in the rear wall portion 120b of the main body 120. One end of the finder barrel 134 holding the ocular 15b is aligned with the opening 44a.

The rear wall portion 122a of the rear cover 122 is formed with a concave film supporting surface 180 for supporting the rear surface of the photographic film 30a. A bottom wall portion 122b of the rear cover 122 has a base portion 186 for supporting the lower end of the film roll 30d in the film roll chamber 34.

Figure 14:
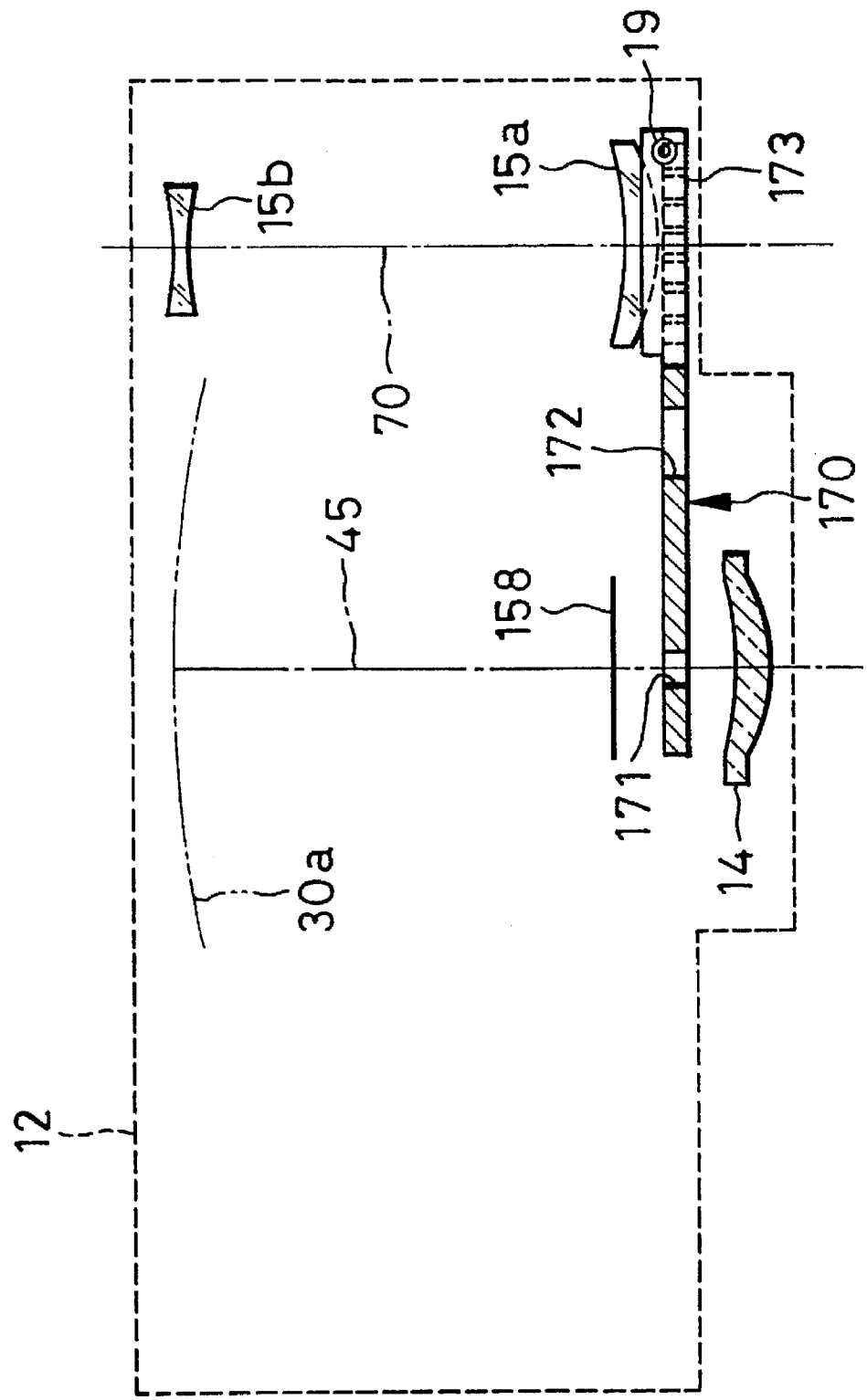
FIG. 14 is an explanatory view illustrating a photography mode switching mechanism in relation to the optical systems of the taking lens and the viewfinder of the film unit shown in FIG. 10.

The operation of the second embodiment is as follows:

The photographer preliminarily rotates a film advancing wheel 18 until the film advancing wheel 18 is locked, whereby the shutter mechanism is cocked. For picture-taking in sunny daylight, the mode-switching knob 19 is set to the daylight photography mode position indicated by the index 13c, whereby the small lens aperture 171 is placed coaxially with the optical axis 45 of the taking lens 14, and simultaneously, the filter portion 173 is placed in front of the finder objective lens 15a, as is shown in FIG. 14. Accordingly, the photographer recognizes from the yellow colored field of view of the viewfinder 15 that the film unit is set in the daylight photography mode.

When the shutter button 16 is depressed, the shutter release lever 149 is rotated in a counterclockwise direction in FIG. 12, to cause the shutter actuating lever 148 to rotate rapidly in a counterclockwise direction. As a result, the tip of the lever 148 is moved to the right in the opening 159 of the shutter blade 158, striking the claw 169 in mid course. The shutter blade 158 is thus rotated by a predetermined angle in a clockwise direction against the force of the spring 166, and then returns to the initial position under the force of the spring 166. Thereby, the shutter blade 158 is opened for a predetermined exposure time, e.g., 1/125 second. The light entering through the taking lens 14 in this exposure time is reflected from the upper and lower mirrors 52 and 54, and focused on the photographic film 30a.

When the shutter blade 158 has returned to the initial position, the tip of the shutter actuating lever 148 reaches the right end of the opening 159, and the film advancing wheel 18 is unlocked. By rotating the film advancing wheel 18, the exposed portion of the photographic film 30a is wound back into the cassette shell 30b, and the shutter actuating lever 148 is moved to the cocked position.

For taking a photograph in the night game mode, the mode switching knob 19 is set in the night game photography position indicated by the index 13d. Thereby, the aperture-stop plate 170 is slid along the groove 67a of the guide plate 67 to position the large lens aperture 172 coaxially of the optical axis 45. Simultaneously, the filter portion 173 is retracted from the front of the objective lens 15a to return the field of view of the viewfinder 15 to the normal color condition.

In the above-described embodiments, because the mode switching knob 19 is disposed slidably along the slot 20 provided on the top wall portion of the film unit, and symbol marks or indicia are provided to indicate the photography mode positions, the photography mode switching operation is easily accomplished without the need for turning the film unit around to face the user.

The filter portion 173 may also be formed from black opaque resin having honeycomb structure openings, instead of being formed of yellow semi-transparent resin. In this alternative embodiment, the field of view of the viewfinder 15 is changed in brightness in the same way as in the case of an ND filter. It is also possible to form the aperture-stop plate 170 from a black opaque resin and thereafter color the filter portion 173 yellow or red. The openings need not be limited to hexagonal, but may be circular or rhombic. The filter portion 173 may also be formed as a colored optical filter having no openings. It is also possible to form a filter separately and to couple it with an aperture-stop plate having the lens apertures. The finder barrel 134 may be formed integrally with the exposure chamber 133.

Although the present invention has been described with respect to the preferred embodiments shown in the drawings, the present invention is not to be limited to the above-described embodiments, but on the contrary, various modifications are possible without departing from the scope of the appended claims.

What is claimed is:

1. In a lens-fitted photographic film unit previously loaded with unexposed photographic film and having a viewfinder, a taking lens and exposure mechanism for exposing said photographic film, the improvement comprising:
    a movable aperture-stop member having at least one lens aperture;
    a switching member movably disposed on an upper wall portion of the film unit and operable to move said aperture-stop member so as to place or displace said lens aperture into or out of the exposure light path of said taking lens; and
    an indication member movable with said stop member and inserted in the field of view of said viewfinder when said lens aperture is placed in said exposure light path.

2. A lens-fitted photographic film unit as recited in claim 1, wherein said aperture-stop member, said switching member and said indication member are incorporated into a mechanism unit with said taking lens and said exposure mechanism.

3. A lens-fitted photographic film unit as recited in claim 1, wherein said viewfinder is an optical viewfinder having an optical axis which is disposed in the substantially same horizontal plane as an optical axis of said taking lens.

4. A lens-fitted photographic film unit as recited in claim 1, wherein said viewfinder is incorporated into said mechanism unit.

5. A lens-fitted photographic film unit as recited in claim 1, wherein said aperture-stop member has a second lens aperture larger in size than said first lens aperture, and said switching member and said indication member are formed integrally with said aperture-stop member as one body which is slidable in a direction perpendicular to the optical axis of said taking lens, wherein said first lens aperture is disposed behind said taking lens when said indication member is disposed in front of said viewfinder.

6. A lens-fitted photographic film unit as recited in claim 5, wherein said indication member is a plate having a plurality of openings arranged in a regular pattern.

7. A lens-fitted photographic film unit as recited in claim 5, wherein said indication member is an optical filter having a predetermined color.

8. A lens-fitted photographic film unit as recited in claim 1, wherein said switching member is slidable above said viewfinder, and said indication member is secured to an under side of said switching member, and said aperture-stop member is coupled to said switching member through an interconnection mechanism.

9. A lens-fitted photographic film unit as recited in claim 8, wherein said aperture-stop member is a lever mounted pivotally about an axis and having said lens aperture in one end portion thereof relative to said axis and coupled to said interconnection mechanism at the opposite end thereof relative to said axis, and wherein said taking lens has a lens aperture larger than said lens aperture of said aperture-stop member.

10. A lens-fitted photographic film unit as recited in claim 9, wherein said interconnection mechanism includes a sliding plate which is coupled to said switching member and moved by said switching member to slide in a range smaller than a sliding range of said switching member.

11. A lens-fitted photographic film unit as recited in claim 9, wherein said indication member is in front of an ocular lens of said viewfinder.

12. A lens-fitted photographic film unit as recited in claim 1, wherein said switching member includes a plate horizontally slidable above said viewfinder and a switching knob formed on an upper portion of said plate and exposed to the outside of the film unit through a slot formed through said upper wall portion of said film unit, and said indication member is fitted in a frame integrally formed on an under side of said plate.

13. A lens-fitted photographic film unit as recited in claim 1, wherein said indication member is a neutral density filter.

14. In a lens-fitted photographic film unit pre-loaded with unexposed photographic film and having a taking lens, exposure mechanism, a viewfinder, an exposure chamber disposed between said taking lens and an exposure frame, a pair of mirrors attached to said exposure chamber so as to provide a Z-shaped light path, the improvement comprising:

a switching plate horizontally slidable above said viewfinder;

a switching knob formed on an upper portion of said plate and exposed to the outside of the film unit;

a semi-transparent filter fitted in a frame integrally formed on an upper side of said plate and removably inserted in the optical path of said viewfinder by operating said switching knob to slide said switching plate;

a lever mounted pivotally about an axis and having a smaller lens aperture than a lens aperture of said taking lens, said lever pivoting behind said taking lens; and an interconnection mechanism interconnecting said lever to said switching plate for causing said lever to move into or out of said light path upon movement of said switching plate to move said filter respectively into or out of said optical path.

15. A lens-fitted photographic film unit having a film supply chamber containing a roll of unexposed photographic film, exposure mechanism for exposing said photographic film one picture frame after another, and a film take-up chamber for winding up said photographic film after exposure;

said film supply and film take-up chambers being formed integrally with an exposure frame as a main body;

the unit having a rear cover and a front cover on opposite sides of said main body, the front and rear covers providing a top wall and a bottom wall for the unit that are integral with said front and rear covers;

said exposure mechanism and a telephotographic optical system including a telephotographic taking lens having a focal length longer than a diagonal length of said picture frame being incorporated in a mechanism unit, and means removably attaching said mechanism unit to said main body for selective removal of said mechanism unit as a unit from said main body;

said mechanism unit comprising an exposure chamber disposed behind said taking lens and having a pair of glass reflecting members attached thereto and so positioned as to provide a Z-shaped telephotographic light path, said reflecting members being held from behind by respective mirror holding members by which said reflecting members are secured to the mechanism unit as a removable assembly disposed between said top and bottom walls.

16. A lens-fitted photographic film unit as recited in claim 15, wherein said mechanism unit has leg portions formed integrally with said exposure chamber, so as to permit said mechanism unit to stand on said leg portions.

17. A lens-fitted photographic film unit as recited in claim 15, wherein said mechanism unit further comprises a stray light shielding member for blocking out extraneous light, said stray light shielding member being disposed sufficiently distant from said taking lens as not to interfere with said telephotographic exposure light path.

18. A lens-fitted photographic film unit as recited in claim 15, wherein said mechanism unit further comprising an optical viewfinder and a movable aperture-stop member having at least a lens aperture;

a switching member movably disposed on an upper wall portion of the film unit and operable to move said aperture-stop member so as to place and displace said lens aperture into and out of said telephotographic exposure light path; and an indication member movable along with said aperture-stop member and disposed in a field of view of said optical viewfinder when said lens aperture is disposed in said telephotographic exposure light path.

19. A lens-fitted photographic film unit as recited in claim 18, wherein said optical viewfinder comprises a convex objective lens and a concave ocular to constitute a magnifying lens system.

20. A lens-fitted photographic film unit as recited in claim 19, wherein a lens frame for holding said magnifying lens system is formed integrally with said exposure chamber.

21. A lens-fitted photographic film unit as recited in claim 18, wherein said aperture-stop member has a second lens aperture different in size from said first lens aperture, and said switching member and said indication member are formed integrally with said aperture-stop member as one body which is slidable in a direction perpendicular to an optical axis of said taking lens, wherein said first lens aperture is placed behind said taking lens when said indication member is placed in front of said viewfinder.

22. A lens-fitted photographic film unit as recited in claim 18, wherein said switching member is slidable above said viewfinder, and said indication member is secured to an under side of said switching member, and said aperture-stop member is coupled to said switching member through an interconnection mechanism.

23. In a lens-fitted photographic film unit having a film supply chamber containing a roll of unexposed photographic film, exposure mechanism for exposing said photographic film one picture frame after another, and a film take-up chamber for winding up said photographic film after exposure;

said film supply and film take-up chambers being formed integrally with an exposure frame as a main body;

said exposure mechanism and a telephotographic optical system including a telephotographic taking lens having a focal length longer than a diagonal length of said picture frame are incorporated in a mechanism unit, and means removably attaching said mechanism unit to said main body for selective removal of said mechanism unit as a unit from said main body;

said mechanism unit further comprising an optical viewfinder and a movable aperture-stop member having at least a lens aperture;

a switching member movably disposed on an upper wall portion of the film unit and operable to move said aperture-stop member so as to place and displace said lens aperture into and out of said telephotographic exposure light path; and an indication member movable along with said aperture-stop member and disposed in a field of view of said optical viewfinder when said lens aperture is disposed in said telephotographic exposure light path.

* * * * *